United States Patent
Moutsios et al.

(10) Patent No.: US 6,551,745 B2
(45) Date of Patent: *Apr. 22, 2003

(54) THIN LITHIUM BATTERY WITH SLURRY CATHODE

(75) Inventors: George W. Moutsios, Parma, OH (US); Xuekun Xing, Richmond Heights, OH (US); Jay Nardi, Avon Lake, OH (US); Frough K. Shokoohi, Kirtland, OH (US); Wanjun Fang, Mentor, OH (US)

(73) Assignees: NGK Spark Plug Co., Ltd. (JP); NTK Powerdex, Inc., Wixom, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/932,886

(22) Filed: Aug. 20, 2001

(65) Prior Publication Data

US 2002/0041999 A1 Apr. 11, 2002

Related U.S. Application Data

(63) Continuation-in-part of application No. 09/272,684, filed on Mar. 19, 1999, now Pat. No. 6,277,520.

(51) Int. Cl.[7] .............................. H01M 4/46; H01M 6/16
(52) U.S. Cl. ........................ 429/224; 429/162; 429/131
(58) Field of Search ................................. 429/224, 162, 429/127, 131

(56) References Cited

U.S. PATENT DOCUMENTS

| 4,429,026 | A |   | 1/1984  | Bruder ...................... 429/152 |
| 4,585,715 | A | * | 4/1986  | Marple ...................... 429/224 |
| 4,977,046 | A |   | 12/1990 | Bleszinski, Jr. et al. .... 429/194 |
| 5,041,199 | A |   | 8/1991  | Di Franco ............... 204/181.5 |
| 5,270,134 | A |   | 12/1993 | Tobishima et al. .......... 429/197 |
| 5,712,059 | A |   | 1/1998  | Barker et al. ............... 429/197 |
| 5,792,576 | A |   | 8/1998  | Xing et al. .................. 429/218 |
| 5,837,397 | A |   | 11/1998 | Xing .......................... 429/162 |
| 5,939,223 | A |   | 8/1999  | Cotte et al. ................. 429/127 |
| 6,277,520 | B1 | * | 8/2001 | Moutsios et al. ........... 429/224 |

* cited by examiner

Primary Examiner—Carol Chaney
(74) Attorney, Agent, or Firm—Mark Kusner; Michael A. Jaffe

(57) ABSTRACT

A cathode slurry for use in a lithium battery, comprised of:
about 60% to about 70% by weight manganese dioxide;
about 5% to about 10% by weight carbon; and
about 25% to about 35% by weight of an electrolyte, said electrolyte comprised of:
about 10% to about 40% by weight ethylene carbonate,
about 60% to about 90% by weight propylene carbonate, and
about 0.5 to about 1.5 moles of triflate salt.

12 Claims, 5 Drawing Sheets

THIN LITHIUM BATTERY WITH SLURRY CATHODE

This application is a continuation-in-part of application Ser. No. 09/272,684 filed on Mar. 19, 1999 now U.S. Pat. No. 6,277,520.

FIELD OF THE INVENTION

The present invention relates generally to batteries, and more particularly, to thin lithium batteries.

BACKGROUND OF THE INVENTION

Thin batteries are typically constructed with an alkali metal anode, a non-aqueous electrolyte, and cathodes of metal oxides. Lithium is most often used as an anode material because it has a low atomic weight and it is highly electronegative. Such thin batteries have a high energy density, a long shelf life and operate efficiently over a wide range of temperatures. As a result, such batteries find advantageous application in a wide variety of electronic devices.

In the past, thin batteries have been manufactured using electrolytes containing volatile solvents. Such solvents tend to evaporate rapidly and therefore require special handling and manufacturing processes. In this respect, once an electrolyte is prepared, it must be used quickly in the manufacturing process as such electrolytes have relatively short useable lives.

The present invention overcomes the problem of using volatile solvents in an electrolyte and provides a cathode/electrolyte slurry with little volatile solvent content having a long shelf life and usability.

SUMMARY OF THE INVENTION

In accordance with the present invention, there is provided an electrochemical cell comprised of a lithium-containing anode, and a cathode slurry comprised of 1) about 60% to about 70% by weight chemical manganese dioxide; 2) about 5% to about 10% by weight carbon; and 3) about 25% to about 35% by weight of an electrolyte consisting essentially of ethylene carbonate, propylene carbonate and triflate salt.

In accordance with another aspect of the present invention there is provided a cathode slurry for use in a lithium battery comprised of: 1) about 60% to about 70% by weight chemical manganese dioxide; 2) about 5% to about 10% by weight carbon; and 3) about 25% to about 35% by weight of an electrolyte comprised of: a) about 10% to about 40% by weight ethylene carbonate; b) about 60% to about 90% by weight propylene carbonate; and c) about 0.5 to about 1.5 moles of triflate salt.

It is an object of the present invention is to provide a thin lithium battery.

Another object of the present invention is to provide a thin lithium battery containing an extrudable cathode/electrolyte slurry.

A still further object of the present invention is to provide a battery as described above, wherein the cathode/electrolyte slurry is essentially not volatile.

A still further object of the present invention is to provide a battery as described above, wherein the cathode/electrolyte slurry has an extended shelf life prior to manufacturing the battery.

Another object of the present invention is to provide a cathode/electrolyte slurry for use in lithium batteries.

These and other objects and advantages will become apparent from the following description of a preferred embodiment of the invention, taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
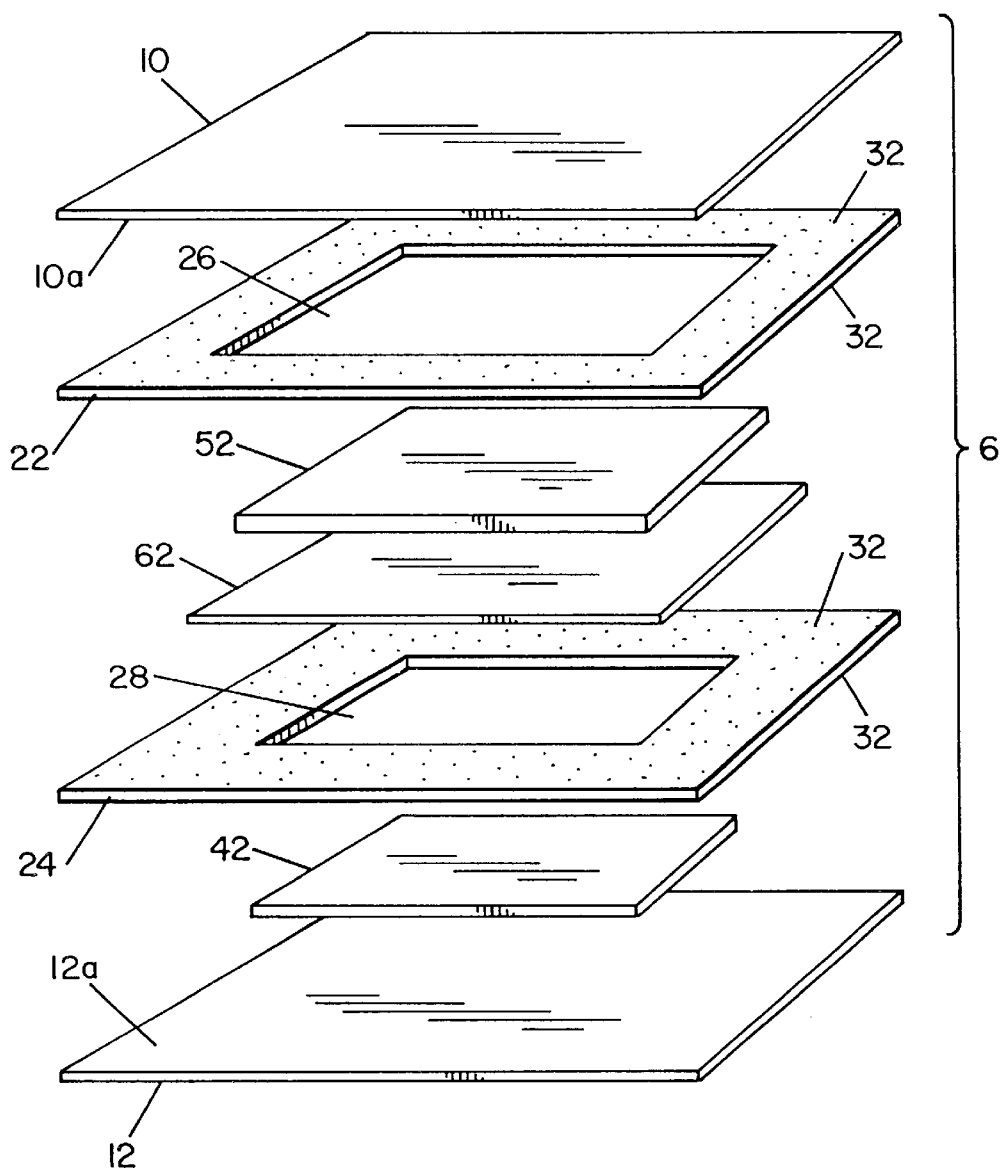
FIG. 1 is an exploded perspective view of a battery illustrating the preferred embodiment of the present invention.

Referring now to the drawings wherein the showings are for the purpose of illustrating a preferred embodiment of the invention only, and not for the purpose of limiting same, the present invention relates to a thin lithium battery 6 and a cathode/electrolyte slurry used therein. FIG. 1 is an exploded view of a battery 6, illustrating a preferred embodiment of the present invention.

Battery 6 is comprised of a plurality of individual layers of material. In the embodiment shown, battery 6 includes two outer layers of metal foil, designated 10 and 12. Metal foil layers 10 and 12 are, respectively, the current collectors for the cathode and anode of battery 10. Foil layers 10 and 12 may be formed from copper, aluminum, nickel, stainless steel or the like. In a preferred embodiment of the present invention, metal layers 10 and 12 are copper and include inner surfaces 10a and 12a having a special treatment layer formed thereon. The preferable thickness of metal layers 10 and 12 is between about 0.0005 to 0.003 inches.

Between metallic layers 10 and 12, a pair of frame layers 22, 24 are disposed. Frame layers 22, 24 are preferably formed of a polymeric material and respectively define voids or cavities 26, 28. Frame layers 22, 24 are dimensioned to extend about the periphery of metal layers 10 and 12, respectively. Frame layers 22, 24 are preferably formed of a plastic material, such as polyester, polyethylene or the like. Both surfaces of frame layers 22, 24 include a thin layer of an adhesive material, designated 32 in the drawings. Examples of adhesives that find advantageous application in the present invention are ethylene vinyl acetate (EVA), polyethylene and ethylene acrylite acid (EEA). Ethylene vinyl acetate is the preferred adhesive.

Void 28 in frame layer 24 is dimensioned to receive a sheet of lithium foil 42. Lithium foil 42 is attached to metallic layer 12 in a manner to insure good contact therebetween. A cathode/electrolyte material, designated 52, is disposed within cavity or void 26 of frame layer 22.

In accordance with one embodiment of the present invention, cathode/electrolyte material 52 is comprised of about 60% to 70% by weight heat-treated electrolytic manganese dioxide, about 5% to about 10% by weight heat-treated carbon, and about 25% to 35% by weight of an electrolyte. In accordance with the present invention, the electrolyte material is comprised of ethylene carbonate (EC), propylene carbonate (PC) and triflate salt. A preferred composition of electrolyte would be as follows:

about 10% to 40% by weight ethylene carbonate;
about 60% to 90% by weight propylene carbonate; and
about 0.5 to 1.5 moles triflate salt.

A more preferred composition of electrolyte would be:

about 15% to 25% by weight ethylene carbonate;
about 75% to 85% by weight propylene carbonate; and
about 0.8 to 1.2 moles triflate salt ($LiCF_3SO_3$).

Figure 4:
FIG. 4 is a photograph showing manganese dioxide particles ($M_nO_2$) used in the present invention magnified 500 times.

The electrolytic manganese dioxide ($M_nO_2$) used in the present invention preferably has an irregular shape, as shown in FIG. 4, which is a photograph of manganese dioxide ($M_nO_2$) at 500× magnification. The manganese dioxide ($M_nO_2$) preferably has a particle size that ranges from about 10 microns to about 30 microns, and an average particle size of about 20 to about 25 microns. The electrolytic manganese dioxide ($M_nO_2$) also preferably has a surface area of about 30 $m^2/g$ to about 50 $m^2/g$, and more preferably about 40–45 $m^2/g$. The electrolytic manganese dioxide ($M_nO_2$) preferably has a total porosity ($N_2$) of about 0.02 to about 0.08 cc/g, and more preferably, a total porosity ($N_2$) of about 0.04–0.06 cc/g.

Cathode/electrolyte material 52 is preferably formed by the following process. The electrolyte manganese dioxide ($M_nO_2$) and the carbon are first "dry heated" to drive off moisture. The electrolyte manganese dioxide ($M_nO_2$) is dry heated to a temperature between about 330° C. to about 400° C., and the carbon is dry-heated to a temperature between about 200° C. to about 280° C. The carbon and electrolyte manganese dioxide ($M_nO_2$) are then dry-blended for about 25 minutes to about 35 minutes. (Teflon binders may be added to facilitate mixing.) The moisture content of the dry powders should be less than 200 ppm after mixing.

The electrolyte, prepared according to the above-identified formula, is then added and mixed into the dry powders. Rather than adding all the electrolyte at once, small, uniform amounts of the electrolyte are periodically added and mixed. The electrolyte and dry powders are mixed for about 18 minutes to about 25 minutes until a uniform slurry consistency is achieved. A cathode/electrolyte material 52 prepared as described above has a consistency similar to wet cement, that lends itself to extruding the material when forming battery 10, and shall be described in greater detail below. Following preparation, cathode/electrolyte material 52 should be maintained in a dry environment to prevent the absorption of moisture by material 52.

In accordance with another embodiment of the present invention, cathode/electrolyte material 52 is formed by using a chemical manganese dioxide ($M_nO_2$), instead of an electrolyte manganese dioxide, in the above-identified process. The chemical manganese dioxide ($M_nO_2$) and carbon are mixed and dry-heated as described above until the moisture content of the mixture has a moisture content of less than 200 ppm after mixing. The electrolyte prepared according to the above-identified formula, is then added to the resultant mixture of the chemical manganese dioxide and mixed to form a slurry as described above.

As will be appreciated by those skilled in the art, other metal oxides and metal sulfides, such as by way of example and not limitation, vanadium oxide ($V_2O_5$), copper oxide (CuO), lithium manganese oxide ($Li_xMnO_2$), iron sulfide ($FeS_2$), etc., that are typically used in battery cells, may also find advantageous application in the present invention.

A separator layer 62 is disposed between frame layers 22, 24. Separator layer 62 separates cathode/electrolyte 52 within void 26 of frame 22 from lithium foil 42 within void 28 of frame 24. Separator 62 is formed of a microporous material to allow electrolyte in cathode/electrolyte material 52 to penetrate therethrough into contact with lithium foil 42. Separator 62 may be formed of polyethylene, polypropylene or the like. In the preferred embodiment, separator layer 62 is a microporous polypropylene.

Figure 2A:
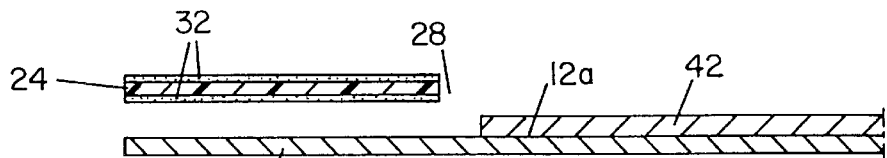
FIGS. 2A–2I show various steps in forming the battery shown in FIG. 1.
Figure 2B:
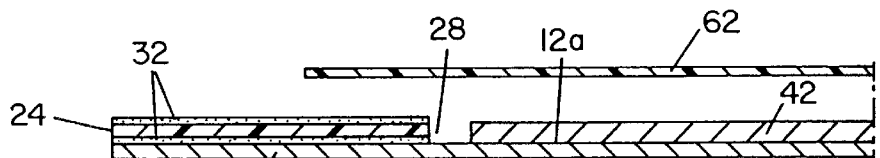
Figure 2C:
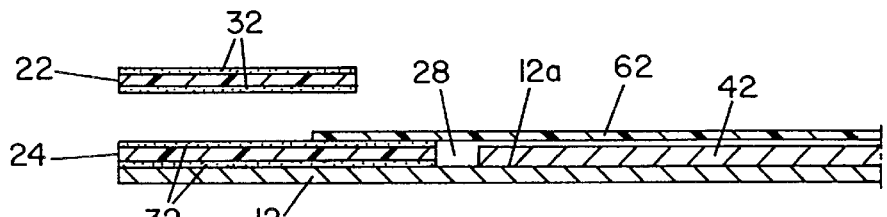
Figure 2D:
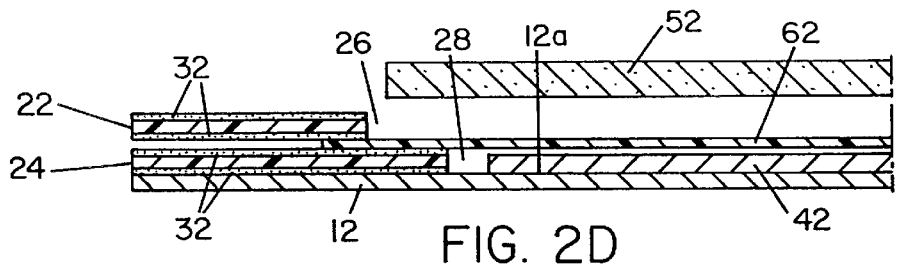
Figure 2E:
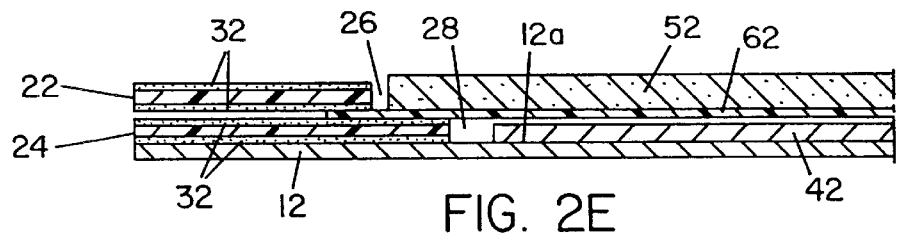
Figure 2F:
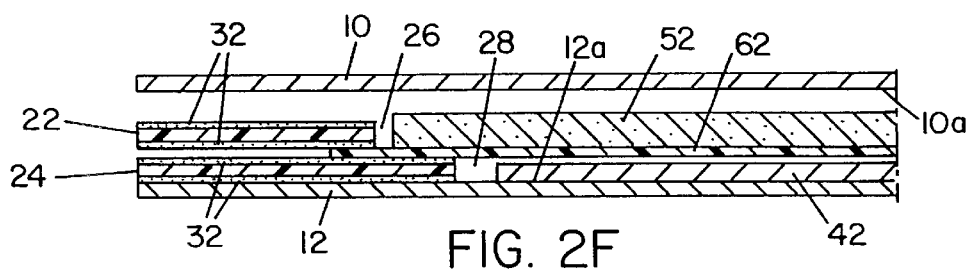
Figure 2G:
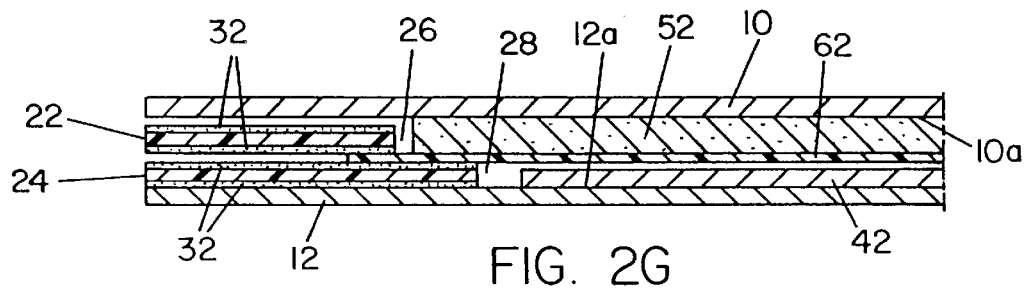

Referring now to FIGS. 2A–2I, a method producing battery 10 is illustrated. Frame layer 22 is applied to metallic layer 12, as best seen in FIG. 2A. Lithium foil 42 is dimensioned to be received within void 28 of frame 24 and is applied to metallic layer 12. Lithium foil 62 is preferably laminated onto surface 12a of metallic layer 12 to insure good contact therewith. Separator layer 62 is then applied onto frame layer 24 to cover and enclose lithium sheet 42 within void 28, as shown in FIGS. 2B and 2C. As seen in FIG. 2B, separator layer 62 is dimensioned such that when applied to frame layer 24, a portion of adhesive 32 on layer 24 remains exposed. Frame layer 22 is then applied onto separator layer 62, as illustrated in FIG. 2C. Frame layer 22 covers the peripheral edge of separator layer 62. The outer periphery of frame layer 22, having adhesive layer 32 thereon, overlays the outer peripheral edge of frame layer 24, also having adhesive layer 32 thereon, as seen in FIG. 2D. Cathode/electrolyte 52 is then deposited within void 26 of frame layer 22. As indicated above, cathode/electrolyte 52 is a slurry-like paste and therefore may be applied by an extruder or by wiping the paste into void 26. In this respect, the amount of cathode/electrolyte 52 deposited in void 26 is sufficient to fill void 26, and preferably is an amount slightly greater, wherein upon assembly of the battery (as shall be described in greater detail below) certain parts of the electrolyte cathode slurry penetrate through separator layer 62 into void 28 of frame layer 24. Following insertion of cathode/electrolyte 52 into void 26 of frame layer 22, metallic layer 10 is applied over frame layer 22, as illustrated in FIG. 2F and FIG. 2G.

Figure 2H:
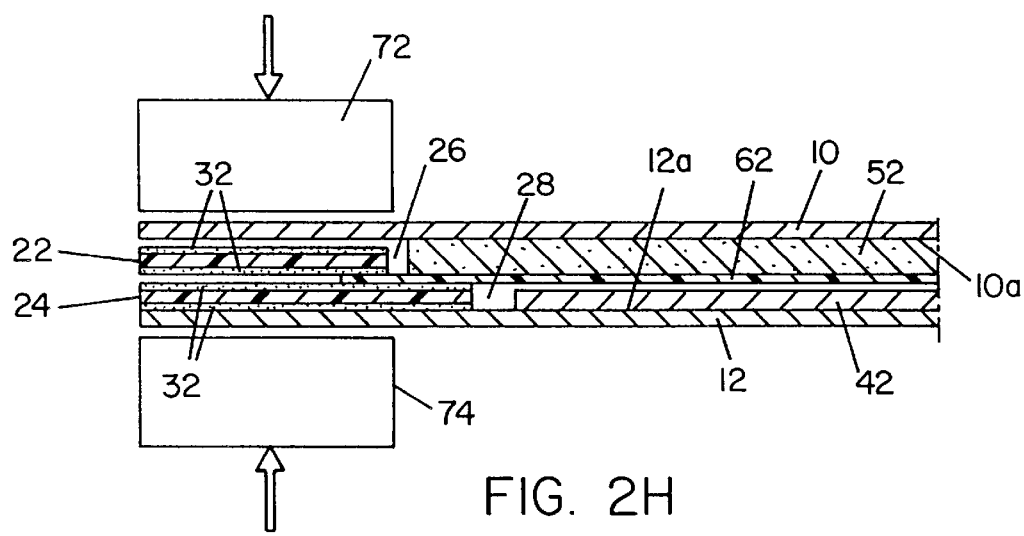
Figure 2I:
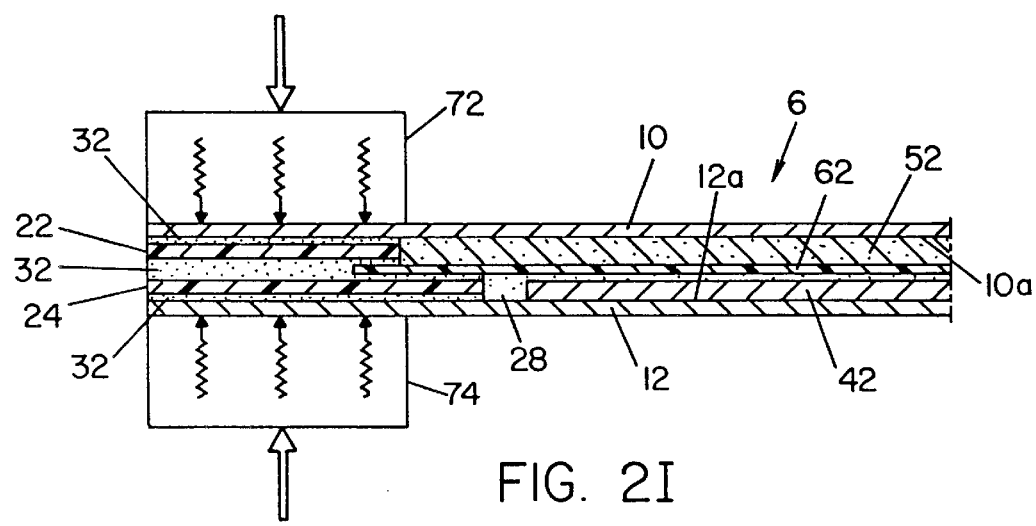
Figure 3:
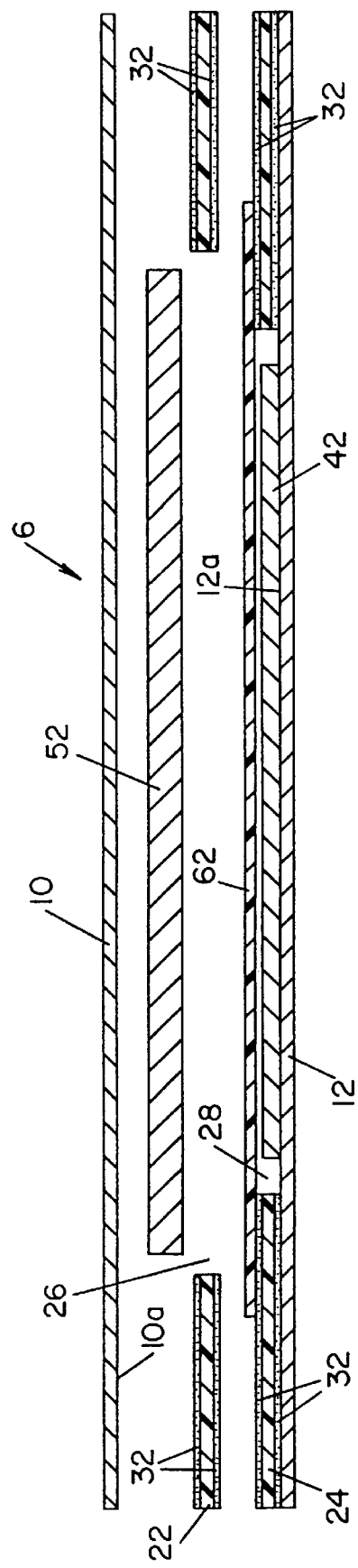
FIG. 3 is a cross-sectional view of the battery shown in FIG. 1.

The assembly of cell 10 is then followed by a sealing step. The sealing step is comprised of heating and compressing the outer peripheral edge of the stacked layers to cause the adhesive 32 on frame layers 22, 24 to bond to each other and to metal layers 10, 12 to form a sealed unit, as schematically illustrated in FIGS. 2H and 2I. In the drawings, heated sealing dies 72, 74 are schematically illustrated. During the sealing step, dies 72, 74 compress the frame area of cell 10 for a period of time sufficient to melt adhesive layers 32 on frames 22, 24 so as to cause adhesive layers to fuse to each other and to metallic layers 10 and 12, thereby producing a sealed battery.

During the compression and sealing step, the paste-like cathode/electrolyte slurry 52 is forced to fill cavity 26 of frame layer 22. The electrolyte component of the cathode/electrolyte material 52 migrates through the microporous separator 62 into contact with lithium layer 42 and metallic layer 12. The migration of the electrolyte component of the cathode/electrolyte material into contact with the lithium layer completes the ionic transport pathway between the anode and a cathode. In FIGS. 2H and 2I, the migration of the electrolyte fluid is illustrated by the "peppered" areas (i.e., dots) that represent the electrolyte fluid migrating through porous separator 62 into void 28 adjacent lithium foil 42.

The present invention shall now be described with respect to a specific example.

EXAMPLE 1

A battery 10 in accordance with the present invention is prepared as follows. A cathode/electrolyte material 52 is prepared having the following composition: 62% electrolytic manganese dioxide ($M_nO_2$), 5.5% carbon and 32.5% electrolyte. The electrolyte has the following composition: 73% propylene carbonate, 13% ethylene carbonate and 14% triflate salt ($LiCF_3SO_3$), respectively by weight. The electrolyte manganese dioxide and carbon are dry-heated to remove moisture. The electrolyte manganese dioxide is heated to about 365° C., and the carbon is heated to about 240° C. The electrolyte manganese dioxide and carbon are mixed for about 30 minutes, and the moisture content is checked to be sure that the dry powders have a moisture content of less than 200 parts per million (ppm). The electrolyte solution is mixed into the dry powders and the combination is mixed for about 20 minutes until a uniform slurry consistency is achieved. The foregoing cathode/electrolyte material 52 is capable of being extruded to a thickness of about 0.2 mm.

A battery 10 as schematically illustrated in the drawings is prepared. A pair of frame layers 22, 24 are prepared from a polymeric material to have a thickness of about 3.5 mils. A thin layer of ethylene vinyl acetate (EVA) is applied to both surfaces of both frames. Rolled copper foil having a thickness of about 1.5 mils is used to form metallic layers 10 and 12. Separator 62 is formed from polyethylene having a thickness of about 25 microns. Lithium foil 42 has a thickness of about 5 mils. Cathode/electrolyte material 52 is extruded to have a thickness of about 15 mils. The respective layers are assembled and heat-sealed using a heated die at about 360° F. that compresses the periphery of battery 6 under a pressure of about 80 psi for about 4 seconds. The heat and pressure causes the EVA adhesive to bond metallic layers 10 and 12 to frame layers 22 and 24, respectively, and likewise bond frame layers 22 and 24 to each other, thereby producing a sealed battery 6.

EXAMPLE 2

A battery 10 in accordance with the present invention is prepared as follows. A cathode/electrolyte material 52 is prepared having the following composition: 62% chemical manganese dioxide ($M_nO_2$), 5.5% carbon and 32.5% electrolyte. The electrolyte has the following composition: 73% propylene carbonate, 13% ethylene carbonate and 14% triflate salt ($LiCF_3SO_3$), respectively by weight. The chemical manganese dioxide and carbon are dry-heated to remove moisture. The chemical manganese dioxide is heated to about 365° C., and the carbon is heated to about 240° C. The chemical manganese dioxide and carbon are mixed for about 30 minutes, and the moisture content is checked to be sure that the dry powders have a moisture content of less than 200 parts per million (ppm). The electrolyte solution is mixed into the dry powders and the combination is mixed for about 20 minutes until a uniform slurry consistency is achieved. The foregoing cathode/electrolyte material 52 is capable of being extruded to a thickness of about 0.2 mm.

A battery 10 as schematically illustrated in the drawings is prepared. A pair of frame layers 22, 24 are prepared from a polymeric material to have a thickness of about 3.5 mils. A thin layer of ethylene vinyl acetate (EVA) is applied to both surfaces of both frames. Rolled copper foil having a thickness of about 1.5 mils is used to form metallic layers 10 and 12. Separator 62 is formed from polyethylene having a thickness of about 25 microns. Lithium foil 42 has a thickness of about 5 mils. Cathode/electrolyte material 52 is extruded to have a thickness of about 15 mils. The respective layers are assembled and heat-sealed using a heated die at about 360° F. that compresses the periphery of battery 6 under a pressure of about 80 psi for about 4 seconds. The heat and pressure causes the EVA adhesive to bond metallic layers 10 and 12 to frame layers 22 and 24, respectively, and likewise bond frame layers 22 and 24 to each other, thereby producing a sealed battery 6.

The present invention thus provides a cathode/electrolyte material 52, and a battery 10 formed therewith that does not contain volatile solvents. As a result, the cathode/electrolyte material itself has a longer "shelf life" may be stored for days prior to use, and therefore eliminates the urgency of utilizing the electrolyte immediately in a production process. In this respect, the cathode/electrolyte material disclosed in the present invention has an extended shelf life. Moreover, the lack of volatility eliminates environmental and safety hazards existing with solvent based electrolytes.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A thin layer electrochemical cell, comprising:
   a lithium-containing anode; and
   a cathode slurry, comprised of:
      about 60% to about 70% by weight manganese dioxide,
      about 5% to about 10% by weight carbon, and
      about 25% to about 35% by weight of an electrolyte consisting essentially of ethylene carbonate, propylene carbonate and triflate salt.

2. A cell as defined in claim 1, wherein said ethylene carbonate comprises about 10% to about 40% by weight of said electrolyte.

3. A cell as defined in claim 2, wherein said ethylene carbonate comprises about 15% to about 25% by weight of said electrolyte.

4. A cell as defined in claim 1, wherein said propylene carbonate comprises about 60% to about 90% by weight of said electrolyte.

5. A cell as defined in claim 4, wherein said propylene carbonate comprises about 75% to about 85% by weight of said electrolyte.

6. A cell as defined in claim 1, wherein said electrolyte includes about 0.5 to about 1.5 moles triflate salt.

7. A cell as defined in claim 6, wherein said electrolyte includes about 0.8 to about 1.2 moles triflate salt.

8. A cell as defined in claim 1, wherein said electrolyte consists essentially of:
   about 20% by weight ethylene carbonate;
   about 80% by weight propylene carbonate; and
   about 1.2 moles triflate salt.

9. A cell as defined in claim 1, wherein said manganese dioxide is chemical manganese dioxide.

10. A cathode slurry for use in a lithium battery, comprised of:
   about 60% to about 70% by weight manganese dioxide;
   about 5% to about 10% by weight carbon; and
   about 25% to about 35% by weight of an electrolyte, said electrolyte comprised of:
      about 10% to about 40% by weight ethylene carbonate,
      about 60% to about 90% by weight propylene carbonate, and
      about 0.5 to about 1.5 moles of triflate salt.

11. A cathode slurry as defined in claim 10, wherein said manganese dioxide is chemical manganese dioxide.

12. A thin layer electrochemical cell, comprising:
- a lithium-containing anode; and
- a cathode slurry, comprised of:
    - a mixture of about 60% to about 70% by weight of a dry heated metal oxide powder and about 5% to about 10% by weight of dry heated carbon powder, said metal oxide powder and carbon powder mixture having an initial moisture content of less than 200 ppm, and
    - about 25% to about 35% by weight of an electrolyte consisting essentially of ethylene carbonate, propylene carbonate and triflate salt.

* * * * *